US008361917B2

(12) United States Patent
Li et al.

(10) Patent No.: US 8,361,917 B2
(45) Date of Patent: Jan. 29, 2013

(54) RARE EARTH ALUMINOBOROSILICATE GLASS COMPOSITION

(75) Inventors: Hong Li, Sewickley, PA (US); Carsten Weinhold, Scranton, PA (US)

(73) Assignee: Schott Corporation, Elmsford, NY (US)

( * ) Notice: Subject to any disclaimer, the term of this patent is extended or adjusted under 35 U.S.C. 154(b) by 68 days.

(21) Appl. No.: 12/851,034

(22) Filed: Aug. 5, 2010

(65) Prior Publication Data

US 2012/0033693 A1 Feb. 9, 2012

(51) Int. Cl.
*C03C 3/068* (2006.01)
*C03C 3/064* (2006.01)
*C03C 3/095* (2006.01)

(52) U.S. Cl. .............................. 501/78; 501/77; 501/64

(58) Field of Classification Search .................. 501/64, 501/66, 77, 78, 79; 372/40; 89/36.02
See application file for complete search history.

(56) References Cited

U.S. PATENT DOCUMENTS

| | | | |
|---|---|---|---|
| 3,174,871 A | | 3/1965 | Walter et al. |
| 4,684,847 A * | | 8/1987 | Spierings et al. ............. 313/493 |
| 5,039,631 A * | | 8/1991 | Krashkevich et al. .......... 501/64 |
| 5,413,971 A * | | 5/1995 | McPherson ...................... 501/78 |
| 5,526,369 A | | 6/1996 | Hayden et al. |
| 5,663,972 A | | 9/1997 | Payne et al. |
| 5,747,397 A * | | 5/1998 | McPherson et al. ............. 501/51 |
| 6,126,732 A | | 10/2000 | Hofmann et al. |
| 6,268,304 B1 * | | 7/2001 | Maeda et al. .................... 501/65 |
| 6,372,155 B1 * | | 4/2002 | Yamazaki et al. ...... 252/301.4 R |
| 6,818,576 B2 * | | 11/2004 | Ikenishi et al. .................. 501/65 |
| 7,351,675 B2 * | | 4/2008 | Kasuga et al. ................... 501/78 |
| 7,449,419 B2 * | | 11/2008 | Li ..................................... 501/36 |
| 7,452,607 B2 * | | 11/2008 | Onoda et al. ................... 428/432 |
| 7,482,296 B2 * | | 1/2009 | Messerschmidt et al. ...... 501/77 |
| 7,548,572 B2 * | | 6/2009 | Schwartz et al. ................ 372/94 |
| 7,681,485 B2 * | | 3/2010 | Neal ............................ 89/36.02 |
| 7,906,444 B2 | | 3/2011 | Liebald et al. |
| 8,053,383 B2 * | | 11/2011 | Ohara et al. ...................... 501/37 |
| 2006/0052231 A1 * | | 3/2006 | Ito et al. ........................... 501/77 |
| 2008/0035887 A1 * | | 2/2008 | Iwao et al. ............... 252/301.4 F |
| 2009/0124481 A1 * | | 5/2009 | Fu .................................... 501/78 |
| 2009/0136702 A1 * | | 5/2009 | Gu .................................. 428/49 |
| 2009/0156384 A1 | | 6/2009 | Liebald et al. |
| 2011/0172076 A1 | | 7/2011 | Ohara et al. |

FOREIGN PATENT DOCUMENTS

| | | |
|---|---|---|
| CN | 1 634 785 | 7/2005 |
| EP | 1 888 475 | 2/2008 |
| FR | 2 184 805 | 12/1973 |
| GB | 1 419 644 | 12/1975 |
| JP | 2004 244226 | 9/2004 |
| JP | 2005 145741 | 6/2005 |
| WO | WO-2010 053057 | 5/2010 |
| WO | WO 2010053057 A1 * | 5/2010 |

OTHER PUBLICATIONS

Derwent Abstract 2004-637725 and machine translation of JP 2004-244226 A, Sep. 2, 2004.*
M. D. Perry et al., "Terawatt to Petawatt Subpicosecond Lasers," Science, vol. 264 (May 13, 1994) pp. 917-924.
W. J. Miniscalco et al., "General Procedure for the Analysis of Er3+ Cross Sections," Optics Letters, vol. 16, No. 4 (Feb. 15, 1991) pp. 258-260.
L .R. P. Kassab et al., "Ge02-PbO-Bi203 Glasses Doped with Yb3+ for Laser Applications," Journal of Non-Crystalline Solids, vol. 348 (2004) pp. 103-107.
J. J. Swab, "Recommendations for Determining the Hardness of Armor Ceramics," Int. J. Appl. Ceram. Technol., vol. 1, No. 3 (2004) pp. 219-225.
H. Li et al., "Optical Spectroscopy Study of Neodymium in Sodium Alumino-Borosilicate Glasses," Journal of Non-Crystalline Solids, vol. 349 (2004) pp. 127-132.
E. Desurvire, "Erbium-Doped Fiber Amplifiers, Principles and Applications," A Wiley Interscope Publication (1994) pp. 215-219.
P. J. Patel et al., "Amptiac — Advanced Materials and Processes Technology," The AMPTIAC Newsletter, Fall 2000, vol. 4, No. 3, pp. 1-19.
Laser Focus World—www.laserfocusworld.com (Apr. 2008) p. 19.
Asahi Glass Co Ltd., "Optical amplification glass and optical waveguide," Patent Abstracts of Japan, Publication Date: Jun. 9, 2005; English Abstract of JP-2005 145741.
Li, H. et al., "Neodymium (III) in alumino-borosilicate glasses," Journal of Non-Crystalline Solids, Dec. 1, 2000, vol. 278, No. 1-3, pp. 35-57.
Li, H. et al., "Optical spectroscopy study of neodymium in sodium alumino-borosilicate glasses," Journal of Non-Crystalline Solids, Dec. 1, 2004, vol. 349, pp. 127-132.
Sumita Optical Glass Inc., "Glass for communication package window," Patent Abstracts of Japan, Publication Date: Sep. 2, 2004; English Abstract of JP-2004 244226.
Xian Inst of Optics & Prec MEC, "Light amplified erbium Ytterbium codoped multi-compnent oxide glass and method manufacturing same," Publication Date: Jul. 6, 2005; English Abstract of CN-1 634 785.
European Search Report for EP 11 17 6701 dated Apr. 12, 2012.

*Primary Examiner* — Karl Group
*Assistant Examiner* — Elizabeth A Bolden
(74) *Attorney, Agent, or Firm* — Millen, White, Zelano & Branigan, P.C.

(57) ABSTRACT

The invention relates to aluminoborosilicate-based glasses suitable for use as a solid laser medium. In particular, these aluminoborosilicate-based laser glasses exhibit broad emission bandwidths of rare earth lasing ions. Although not entirely understood, the broadening of the emission bandwidth is believed to be achieved by the presence of significant amounts of lanthanide ions in the glass matrix. In addition, because of the high values of Young's modulus, fracture toughness and hardness, the rare earth aluminoborosilicate glass system according to the invention is also suitable as transparent armor window material.

29 Claims, 2 Drawing Sheets

RARE EARTH ALUMINOBOROSILICATE GLASS COMPOSITION

SUMMARY OF THE INVENTION

The invention relates to the use of aluminoborosilicate-based glasses as a solid laser medium. In particular, the invention relates to broadening the emission bandwidth of rare earth ions used as lasing ions in an aluminoborosilicate-based glass composition. Although not entirely understood, the broadening of the emission bandwidth is believed to be achieved by the presence of significant amounts of lanthanide ions in the glass matrix. In addition, because of the high values of Young's modulus, fracture toughness and hardness, the rare earth aluminoborosilicate glass system is also suitable as transparent armor window material.

Laser glasses are produced by doping host glass systems with rare earth elements that have the ability to lase, such as neodymium and ytterbium. The lasing ability of these rare earth doped laser glasses results from the light amplification achieved by stimulated emission of the excited rare earth element ions within the glass.

Phosphate laser glasses are well known for use as a host matrix for high average power and high peak energy laser systems. See, for example, Payne et al. (U.S. Pat. No. 5,663,972) which discloses the use of Nd-doped phosphate laser glasses described as having broad emission bandwidths. Hayden et al. (U.S. Pat. No. 5,526,369) also discloses Nd-doped phosphate laser glasses. In this case, the laser glass is said to desirably have a narrow emission bandwidth (less than 26 nm) to improve extraction efficiency. In this typical type of laser, the emission of a typical laser is narrow compared to the emission bandwidth, and thus, the emitted light at wavelengths outside of the narrow bandwidth at which the laser operates is effectively wasted. For this reason, narrow emission bandwidths were desirable.

One general trend in solid state lasers is to make high energy lasers with shorter pulse lengths, which drives the power in the pulse to very high numbers. For example, a 10 k Joule laser with a 10 nsec pulse length is a power of 1 TW (1 TW=10000 J/10 nsec). However, for high peak power lasers using ultra-short pulses (<100 femto-second pulses or shorter), the emission bandwidth offered by known phosphate laser glass is too narrow compared to that required. To address this problem so-called "mixed" laser glass laser designs are used. Phosphate and silicate glasses are used in series to achieve the total bandwidth required for current petawatt laser systems. But, the technology of using the mixed glasses is insufficient for future exawatt laser systems. New broader band phosphate glass, with or without silicate glass used in series, will be required.

The trend towards the use of high energy lasers with shorter pulse lengths is described in "Terrawatt to pettawatt subpicosecond lasers", M. D. Perry and G. Mourou, Science, Vol 264, 917-924 (1994). These lasers use a technique called Chirped Pulse Amplification (CPA) to generate ultra-short laser pulses. To work effectively, this technique requires gain media with an emission bandwidth as large as possible. In Table 1, M. D. Perry and G. Mourou describe the emission bandwidths, along with pulse length and theoretical peak, for some typical solid state laser systems.

In addition to phosphate glasses, silicates, borates, borosilicates, and aluminates have also been used as host glass matrix systems for lasing ions. Silicate, borate, borosilicates, and aluminate glasses have broader emission bandwidth for Nd lasing ions, in comparison to phosphate glasses.

However, there are disadvantages associate with the use of these glasses. For example, silicate glasses normally melt at very high temperature, unless they contain significant amount of modifiers, such as alkali metals or alkaline earths metals. Borate glasses, on the other hand, have low temperature melting characteristics, but they require substantially high concentrations of alkali metals or alkaline earth metals to be stable in ambient environments. Borosilicate glasses can be durable at ambient temperature and also are melted at temperatures comparable to standard commercial glasses, such as soda-lime glass. However, typical commercial borosilicate glasses contain significant amounts of alkali metals, which promote high borate volatility, similar to phosphate glass, during melting. Aluminate glasses exhibit particularly broad emission bandwidths and are attractive for short pulse laser operation. But, these glasses have a very high tendency towards crystallization.

The $MgO-Al_2O_3-SiO_2$ and $MgO-Al_2O_3-B_2O_3$ compositional systems are known to provide high Young's modulus values. However, both systems suffer from very high melting temperature, i.e., not less than 1,600° C. Furthermore, the $MgO-Al_2O_3-SiO_2$ system suffers from a high crystallization rate. Only a fast cooling rate of, for example, more than $5 \times 10^5$ °C./min, enables the attainment of a crystal-free glass, when the composition is cooled from 1,550° C. As a result, this compositional system is impractical for making bulk and stress free forms for applications such as laser glasses or armor windows.

An important factor in designing laser systems that utilize short pulses is to find gain materials with broad emission bandwidth for the laser transition. The relationship between emission bandwidth and pulse length is: Bandwidth×Pulse Duration$\geq$0.44. Clearly, to achieve ever shorter pulse durations it is a requirement to identify glasses with a broad emission bandwidth.

Transition metal doped crystals offer broad emission bandwidth. For example, the Hercules laser described in Laser Focus World, April 2008, pp. 19-20, uses Ti doped sapphire crystals.

Another way to make super short pulse length lasers is with rare earth doped glasses. The advantages of such glasses over crystals include lower costs, higher available energies (since glass can be manufactured in large sizes of high optical quality, while Ti doped sapphire is limited in size), and simpler designs can be implemented since the glass approach can be pumped by flashlamps (Ti doped sapphire short pulse lasers are pumped by glass lasers which are pumped by flashlamps, so the glass approach does not require one to first build pump lasers).

As noted above, U.S. Pat. No. 5,663,972 discloses the usefulness of broadband glasses. However, the Nd-doped phosphate glass described therein is difficult to make at high yield. Moreover, there is still a need for a material having even larger emission bandwidth.

Glasses, glass ceramics, ceramics, and composites thereof, that have desirable physical properties such as high elastic modulus, fracture toughness and hardness, can be used in transparent armor applications. See, for example, "Transparent Armor," P. J. Patel et al., The AMPTIAC Newsletter, Vol. 4, No. 3, pp 1-21 (2000).

According to one aspect of the invention, there is provided an aluminoborosilicate glass composition for use as a solid laser medium having a broad emission bandwidth of rare earth ions used as lasing ions. According to another aspect of the invention, there is provided a rare earth aluminoborosilicate glass system suitable as transparent armor window material. When used as a transparent armor window material, the glass composition according to the invention need not contain any lasing ions. The glass system according to the invention, $RE_2O_3$—$Al_2O_3$—$B_2O_3$—$SiO_2$ (where "RE" represents rare earth), offers less stringent melting and annealing processes making the system one that is suitable for making stress free bulk forms for use as active gain (laser) or armor window materials.

Upon further study of the specification and appended claims, further aspects and advantages of this invention will become apparent to those skilled in the art.

In accordance with the invention, an aluminoborosilicate glass composition containing a high content of lanthanide ions (for example, $La_2O_3$) is used as a broad emission bandwidth laser glass.

The glasses disclosed herein are suitable for use at powers of more then 1000× to 1000000× higher (pettawatt to exawatt level, or even higher). The disclosed glasses can be used to achieve pulse lengths less then 100 fsec and they will have sufficient high gain to get output energies of >100 kJ. In laser systems, the glasses according to the invention can be energized by the use of a flashlamp as a pump source. Laser diode pumping is also possible.

In accordance with the invention, the aluminoborosilicate glass can optionally contain amounts of conventional modifier oxides, such as alkali and/or alkaline earth metals, so long as their inclusion does not result in poor melting behavior and does not compromise the desirable features of the aluminoborosilicate glass. The total amount of such modifiers is desirable less then 27 mol % of monovalent modifiers, such as $Na_2O$, and less then 30 mol % of divalent modifiers, such as MgO.

But, while the general glass composition according to the invention may include alkali and/or alkaline earth metals, in accordance with another aspect of the invention the aluminoborosilicate glass composition does not contain any alkali or alkaline earth metals. In this case, the absence of alkali and alkaline earth metals provides a very low volatility during melting.

While not being bound by any specific theory, in accordance with the invention, it is believed that the band broadening can be achieved by controlling the proportions of the network domains, one enriched in Si—O—Si units, and another enriched in B—O—B units. By controlling the proportions of the silicate and borate rich network domains, the lasing ion partitioning in both domains can be controlled and therefore, the lasing ion emission bandwidth can be broadened. In addition, it is believed that modifying the borate rich network domains with amounts of $Al_2O_3$ will lead to the association of lasing ions with the domain. The lasing ions in different domains will experience different ligand fields and therefore the emission bandwidth from each domain will be different in terms of emission peak position and in the amount of emission width. As a result, it is believed that the emission bandwidth will be broadened.

Furthermore, the ratio of $Al_2O_3$ to $La_2O_3$ and the total concentration of $La_2O_3$ and $Al_2O_3$ can be adjusted to influence the lasing ion partitioning in both network domains. The concentration of the lasing ion is also a factor in controlling the lasing ion partitioning between the two network domains, and thus is also a factor in controlling band broadening.

For example, in accordance with the invention, it is believed that the emission bandwidth can be broadened by replacing some of the lasing ion (e.g., $Nd_2O_3$ or $Yb_2O_3$) with $La_2O_3$. See "Optical Spectroscopy of Neodymium in Sodium Alumino-Borosilicate Glasses," Hong Li et al. It is believed that by replacing part of the lasing ion concentration in an aluminoborosilicate glass composition with $La_2O_3$, thereby reducing the lasing ion concentration, the $La^{3+}$ will separate the lasing ions from one another and thereby reducing the emission quenching resulting from energy transfer between two lasing ions (e.g., $Nd^{3+} \rightarrow Nd^{3+}$).

In addition, in the case where the glasses of the invention contain $R_2O$ (R=Li, Na, K, Rb, Cs) to obtain high quality optical glasses, it is preferable that the ratio of $R_2O/(Al_2O_3+R_2O)$ fall into two ranges, one low and one high. Specifically these ratio values should be <0.40 or >0.60 to avoid phase separation and the related drop in optical quality that results.

In accordance with an aspect of the invention, the aluminoborosilicate glass composition comprises (based on mol %):

| | |
|---|---|
| $SiO_2$ | 25.00-57.00 |
| $B_2O_3$ | 5.00-28.00 |
| $Al_2O_3$ | 2.00-27.00 |
| $La_2O_3$ | 0.00-28.00 |
| $R_2O$ (R = Li, Na, K, Rb, Cs) | 0.00-27.00 |
| MO (M = Mg, Ca, Sr, Ba, Zn) | 0.00-30.00 |
| $Ln_2O_3$ (Ln = Nd, Yb, or other lasing rare earth ions) | >0.30-10.00 |
| Sum of $La_2O_3 + Ln_2O_3$ | >0.30-30.00 |

In accordance with an aspect of the invention directed towards the transparent armor window application, the aluminoborosilicate glass composition comprises (based on mol %):

| | |
|---|---|
| $SiO_2$ | 25.00-57.00 |
| $B_2O_3$ | 5.00-28.00 |
| $Al_2O_3$ | 2.00-27.00 |
| $La_2O_3$ | 0.00-28.00 |
| $R_2O$ (R = Li, Na, K, Rb, Cs) | 0.00-27.00 |
| MO (M = Mg, Ca, Sr, Ba, Zn) | 0.00-30.00. |

In accordance with another aspect of the invention, the aluminoborosilicate glass composition comprises (based on mol %):

| | |
|---|---|
| $SiO_2$ | 30.00-55.00 |
| $B_2O_3$ | 5.00-25.00 |
| $Al_2O_3$ | 3.00-25.00 |
| $La_2O_3$ | 0.00-25.00 |
| $R_2O$ (R = Li, Na, K, Rb, Cs) | 0.00-20.00 |
| MO (M = Mg, Ca, Sr, Ba, Zn) | 0.00-27.00 |
| $Ln_2O_3$ (Ln = Nd, Yb, or other lasing rare earth ions) | >0.30-9.0 |
| Sum of $La_2O_3 + Ln_2O_3$ | >0.30-28.00 |

In accordance with an aspect of the invention directed towards the transparent armor window application, the aluminoborosilicate glass composition comprises (based on mol %):

| | |
|---|---|
| $SiO_2$ | 30.00-55.00 |
| $B_2O_3$ | 5.00-25.00 |
| $Al_2O_3$ | 3.00-25.00 |
| $La_2O_3$ | >0.00-25.00 |
| $R_2O$ (R = Li, Na, K, Rb, Cs) | 0.00-20.00 |
| MO (M = Mg, Ca, Sr, Ba, Zn) | 0.00-27.00. |

In accordance with the invention, the aluminoborosilicate glass composition comprises (based on mol %):

| | |
|---|---|
| $SiO_2$ | 50.00-57.00 |
| $B_2O_3$ | 10.00-20.00 |
| $Al_2O_3$ | 3.00-10.00 |
| $La_2O_3$ | 1.00-10.00 |
| $Yb_2O_3$ | 0.00-10.00 |
| $Nd_2O_3$ | 0.00-6.00 |
| $R_2O$ (R = Li, Na, K, Rb, Cs) | 15.00-20.00 | wherein the aluminoborosilicate glass composition is essentially free of alkaline earth metals.

In accordance with the invention, the aluminoborosilicate glass composition comprises (based on mol %):

| | |
|---|---|
| $SiO_2$ | 40.00-50.00 |
| $B_2O_3$ | 10.00-15.00 |
| $Al_2O_3$ | 15.00-25.00 |
| $La_2O_3$ | 0.00-5.00 |
| $Yb_2O_3$ | 0.00-5.00 |
| $Nd_2O_3$ | 0.00-5.00 |
| MO (M = Mg, Ca, Sr, Ba, Zn) | 15.00-25.00 | wherein the aluminoborosilicate glass composition is essentially free of alkali metals.

In accordance with the invention, the aluminoborosilicate glass composition comprises (based on mol %):

| | |
|---|---|
| $SiO_2$ | 40.00-50.00 |
| $B_2O_3$ | 5.00-25.00 |
| $Al_2O_3$ | 15.00-27.00 |
| $La_2O_3$ | 11.00-25.00 |
| $Yb_2O_3$ | 0.00-10.00 |
| $Nd_2O_3$ | 0.00-6.00 | wherein the aluminoborosilicate glass composition is essentially free of alkali metals and alkaline earth metals.

In accordance with the invention, the aluminoborosilicate glass composition comprises (based on mol %):

| | |
|---|---|
| $SiO_2$ | 40.00-50.00 |
| $B_2O_3$ | 5.00-18.00 |
| $Al_2O_3$ | 15.00-27.00 |
| $La_2O_3$ | 11.00-25.00 |
| $Yb_2O_3$ | 0.00-10.00 |
| $Nd_2O_3$ | 0.00-6.00 | wherein the aluminoborosilicate glass composition is essentially free of alkali metals and alkaline earth metals.

Essentially free of alkali metals means that the aluminoborosilicate glass composition according to the invention contains less than 0.5 mol % of alkali metals (such as $Na_2O$, $Li_2O$, and $K_2O$), especially less than 0.1 mol %. Essentially free of alkaline earth metals means that the aluminoborosilicate glass composition according to the invention contains less than 0.5 mol % of alkaline earth metals (such as BaO, CaO, and MgO), especially less than 0.1 mol %.

With respect to the laser glass application, the aluminoborosilicate glass composition according to the invention contains a sufficient amount of $Ln_2O_3$, wherein Ln represents a rare earth lasing ion, to provide lasing capabilities. Generally, the amount of $Ln_2O_3$ is about 0.3-10 mol %, for example, 0.5-8 mol % or 0.5-6 mol %. The lasing element Ln is preferably Nd or Yb, but can also be, for example, Er or Pr. Er has a lasing wavelength that is eyesafe, and Pr can lase at visible wavelengths. Yb and Nd both lase in the IR range. Still other lasing ions are Sm, Eu, Tb, Dy, Ho and Tm. The lasing ions can be used alone or in combinations of two or more elements.

According to another aspect, the aluminoborosilicate glass composition according to the invention contains 25.00-57.00 mol % of $SiO_2$, for example, 27.00-57.00 mol % of $SiO_2$ or 28.00-56.00 mol % of $SiO_2$, or 29.00-55.00 mol % of $SiO_2$, or 43.00-50.00 mol % of $SiO_2$, or 44.00-49.00 mol % of $SiO_2$, or 45.00-48.00 mol % of $SiO_2$.

According to another aspect, the aluminoborosilicate glass composition according to the invention contains 5.00-28.00 mol % of $B_2O_3$, for example, 6.00-27.00 mol % of $B_2O_3$ or 7.00-26.00 mol % of $B_2O_3$, or 8.00-25.00 mol % of $B_2O_3$, or 6.00-15.00 mol % of $B_2O_3$, or 7.50-14.00 mol % of $B_2O_3$, or 8.00-13.00 mol % of $B_2O_3$.

According to another aspect, the aluminoborosilicate glass composition according to the invention contains 2.00-27.00 mol % of $Al_2O_3$, for example, 2.00-25.00 mol % of $Al_2O_3$ or 3.00-24.00 mol % of $Al_2O_3$, or 4.00-23.00 mol % of $Al_2O_3$, or 16.00-25.00 mol % of $Al_2O_3$, or 16.50-24.00 mol % of $Al_2O_3$, or 17.00-23.00 mol % of $Al_2O_3$.

According to another aspect, the aluminoborosilicate glass composition according to the invention generally contains 0.00-28.00 mol % of $La_2O_3$, for example, 1.00-27.00 mol % of $La_2O_3$ or 3.00-26.00 mol % of $La_2O_3$ or 5.00-25.00 mol % of $La_2O_3$, or 12.00-24.00 mol % of $La_2O_3$, or 13.00-23.50 mol % of $La_2O_3$, or 14.00-23.00 mol % of $La_2O_3$.

According to another aspect, the sum of the $La_2O_3$ and $Ln_2O_3$ content in aluminoborosilicate glass composition according to the invention is generally 0.50-28.00 mol %, for example, 8.00-26.00 mol % or 9.00-25.00 mol %, or 20.00-26.00 mol % of $La_2O_3$.

According to another aspect, the aluminoborosilicate glass composition according to the invention contains 0.10-10.00 mol % $Yb_2O_3$ and/or 0.10-5.00 mol % $Nd_2O_3$, for example, 0.10-8.00 mol % $Yb_2O_3$, or 0.5-8.00 mol % $Yb_2O_3$, and/or 0.5-6.00 mol % $Yb_2O_3$ and/or 0.50-4.00 mol % $Nd_2O_3$.

According to another aspect, the ratio of $Al_2O_3$ to $La_2O_3$ in the aluminoborosilicate glass composition according to the invention is, for example, 0.70-5.00, such as 0.70-1.25, or 0.75-3.50, or 0.75-1.10, or 0.80-1.05.

According to another aspect of the invention, the aluminoborosilicate glass composition, in the case where the glass contains $R_2O$ (R=Li, Na, K, Rb, Cs), the ratio of $R_2O/(Al_2O_3+R_2O)$ is, for example, <0.40 or >0.60 such as <0.30 or >0.70.

In the glass composition, $SiO_2$ and $B_2O_3$ each act as primary network formers to form two network domains, one enriched in Si—O—Si units, and the other enriched in B—O—B units. The amount of $SiO_2$ used in preparing the glass is 27.00-57.00 mol %, for example, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, or 57 mol %. The amount of $B_2O_3$ used in preparing the glass is 6.00-27.00 mol %, for example, 6, 7, 8, 9, 10, 11, 12, 13, 14, 15, 16, 17, 18, 19, 20, 21, 22, 23, 24, 25, 26, or 27 mol %.

In the glass composition, $Al_2O_3$ and $La_2O_3$ act as intermediate glass formers. They can exhibit have characteristics of both a glass former and a glass modifier. The amount of $Al_2O_3$ used in preparing the glass is 2.00-25.00 mol %, for example, 2, 3, 4, 5, 6, 7, 8, 9, 10, 11, 12, 13, 14, 15, 16, 17, 18, 19, 20, 21, 22, 23, 24, or 25 mol %. The amount of $La_2O_3$ used in preparing the glass is 1.00-27.00 mol %, for example, 1, 2, 3, 4, 5, 6, 7, 8, 9, 10, 11, 12, 13, 14, 15, 16, 17, 18, 19, 20, 21, 22, 23, 24, 25, 26, or 27 mol %.

As noted above, $Yb_2O_3$ and/or $Nd_2O_3$ provide the preferred lasing ions for the glass composition. Alternatively, other rare earths or combinations of rare earth oxides can be used as lasing ions, for example $Er_2O_3$ and/or $Pr_2O_3$. In addition, as is well known to those skilled in the art, these laser glasses can be doped with small amounts of transition metals, such as $Cr_2O_3$, or other rare earth ions, such as $Yb_2O_3$ and $CeO_2$, that act as sensitizers to the primary lasing ion(s). For example, $Cr_2O_3$ can function as a sensitizer for Yb, and $CeO_2$, $Cr_2O_3$ and $Yb_2O_3$ can function as sensitizers for Er. For $Cr_2O_3$ the amount of sensitizer is, for example, >0.00 to 0.40 wt %, preferably 0.01 to 0.20 wt %, and for $Yb_2O_3$ the amount of sensitizer is, for example, >0.00 to the solubility limit for $Yb_2O_3$ in the glass, preferably 5 wt % to 25 wt %.

The glasses according to the invention can also be prepared commonly prepared without a lasing ion. As noted above, such glasses can be used in transparent armor applications such as the glass layer in a glass layer/ceramic layer composite.

Transparent armor systems for personnel- and vehicle protection are typically multi-layer composites comprising several layers of glass-, transparent glass-ceramic, and/or ceramic materials bonded together with polymers. The resulting composite must be sufficiently transparent and essentially free of optical distortion, while providing adequate protection against a variety of threats at minimum weight and minimum cost.

Inorganic transparent materials presently used for ballistic protection include (a) glasses, for example boro-silicate and soda-lime sheet glass typically manufactured by rolling, the float process, and other drawing processes such as the overflow-fusion process; (b) glass-ceramic materials, for example GEC Alstom TransArm, typically manufactured by ceramizing cast, rolled, or drawn sheet; and (c) crystalline materials such as spinel, sapphire, and aluminum oxynitride (AlON).

The individual layers of the transparent armor systems system may be bonded together with an adhesive material hereinafter referred to as interlayer. Forms of adhesive interlayer materials include, but are not limited to, liquids, pastes, gels, and sheet or film. When using sheet- or film-like interlayer, bonding is typically achieved by the application of heat and/or pressure to the stacked materials; to avoid the entrapment of air, the assembled stack of layers and interlayer is typically placed in a vacuum bag. Adhesives in liquid, paste or gel form maybe applied to the surfaces of individual layers during the stacking process using known techniques such as spraying, rolling or casting, or maybe cast into gaps between layers of the assembled stack. Curing of these adhesives is typically achieved by exposure to heat and/or radiation, and/or the addition of a chemical catalyst prior or during the application process.

Transparent ceramic materials such as spinel, sapphire and AlON exhibit superior ballistic performance over other transparent materials. However, these materials are currently not commercially available in sizes of interest for armor applications. Currently the cost for armor-grade transparent ceramic plates with a thickness of ¼" typically exceeds 25$ per square inch.

To stop a projectile, armor systems typically engage various defeat mechanisms including projectile-destabilization, -fragmentation, and -erosion while delaying damage to and/or limiting damage propagation within the target.

It is generally believed that hardness and fracture toughness of a material contribute to its ballistic performance. One common hypothesis states that in order to fragment a projectile the target material has to have sufficient hardness, and that above a certain threshold an increase in target material hardness no longer leads to an increase in ballistic performance. See: J J Swab, "Recommendations for Determining the Hardness of Armor Ceramics", Int. J. Applied Ceram. Technol., Vol. 1 [3] (2004), pp 219-225

To close the ballistic performance gap to transparent ceramics, glasses having high elastic modulus, hardness, and fracture toughness and which can be manufactured in large sheets at a comparatively low cost, are of special interest, for example, glasses having a elastic modulus of 100 GPa or higher, a hardness (KH) of 620 or higher, and a fracture toughness (KIC) of greater than 1.0 M Pa.

In addition to the transparent armor application, glasses according to the invention prepared without a lasing ion can also be used as a cladding glass in a laser waveguide device. Additionally, by doping the glasses according to the invention with one or more transition metals that introduce absorption at the lasing wavelength, the resultant transition metal-doped glass can serve as an edge cladding glass in certain laser system designs.

With regards to the additional components, the glass contains a maximum of 4 weight percent, especially a maximum of 2 weight percent, of conventional additives or impurities, such as refining agents (e.g., $As_2O_3$ and $Sb_2O_3$) and antisolarants (e.g., $Nb_2O_5$). In addition, the glass composition may contain halides to help dry the melt or residual water and to help refining of the glass. For example, the glass composition may contain up to 9 wt % F, preferably not more 5 wt %, and, up to 5 wt % Cl, although Cl is less preferred than F.

In accordance with another aspect of the invention, the aluminoborosilicate glass composition according to the invention possesses an effective emission bandwidth ($\Delta\lambda_{eff}$) of at least 33 nm, preferably at least 35 nm, especially at least 40 nm, and in particular at least 42 nm, for example 33-65 nm or 35-65 nm.

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium Doped Fiber Amplifiers*, John Wiley and Sons (1994). The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or ($\Delta\lambda_{FWHM}$).

An emission curve for Yb will exhibit a narrow feature at ~980 nm. If this feature is prominent, the $\Delta\lambda_{FWHM}$ value will only reflect the width of this one feature and the rest of the curve will not contribute. As a result the $\Delta\lambda_{FWHM}$ value is not always a reliable indicator of the emission bandwidth for Yb.

The second method divides every point on the emission curve by the total area under the curve. The result, called a linewidth function, will have a peak value that is defined as the inverse of the effective bandwidth, $\Delta\lambda_{FWHM}$. By this method the entire emission curve always contributed to the emission bandwidth result. It is this value used herein in the analysis as the best indicator of emission bandwidth.

In accordance with another aspect of the invention, the aluminoborosilicate glass composition according to the invention possesses a Young's Modulus, of at least 80 GPa, preferably at least 90 GPa, especially at least 100 GPa, and in particular at least 105 GPA, for example 80-110 GPa or 105-110 GPa.

In accordance with another aspect of the invention, the aluminoborosilicate glass composition according to the invention possesses an Indentation Fracture Toughness for 3.0N Load, $K_{IC}$, of at least 0.80 MPa·m$^{1/2}$, preferably at least 0.90 MPa·m$^{1/2}$, especially at least 0.95 MPa·m$^{1/2}$, and in particular at least 1.00 MPa·m$^{1/2}$, for example 0.80-1.20 MPa·m$^{1/2}$ or 1.00-1.20 MPa·m$^{1/2}$.

In accordance with another aspect of the invention, the aluminoborosilicate glass composition according to the invention possesses a Knoop Hardness, HK, of at least 550, preferably at least 600, especially at least 620, and in particular at least 630, for example 550-690 or 630-700.

The above-mentioned physical properties of Young's Modulus, Indentation Fracture Toughness, and Knoop Hardness are particularly useful when the glass according to the invention is to be used in a transparent armor application.

BRIEF DESCRIPTION OF THE DRAWINGS

The invention and further details, such as features and attendant advantages, of the invention are explained in more detail below on the basis of the exemplary embodiments which are diagrammatically depicted in the drawings, and wherein.

Tables 1A and 1B list examples of the glass composition according to the invention. All of the glasses are made using laser grade ingredients and melted under a dry oxygen environment with stirring, using a Pt stirrer for better homogeneity.

To determine the emission spectrum, the glasses are cast into molds and appropriately annealed to remove stress. Yb-doped glasses are then ground into fine powders using tungsten carbide grinding cell. Nd-doped glasses are prepared as bulk cuvette samples at least nominally 10 mm×10 mm×40 mm in size. A powder sample of each Yb doped glass and a cuvette samples of each Nd doped glass is used to measure an emission spectrum, from which the effective emission bandwidth ($\Delta\lambda_{eff}$) is determined according to Equation (1):

$$\Delta\lambda_{eff} = \frac{\int I(\lambda)d\lambda}{I_{max}} \quad (1)$$

where the integrated area of the emission spectrum is made between 925 and 1100 nm for Yb and from 1000 nm to 1200 nm for Nd and the maximum emission intensity ($I_{max}$) is found at the wavelength close to 975 nm for Yb and close to 1055 nm for Nd.

In Table 1A, the glass of Example 1 represents a control embodiment for the laser glass aspect since it contains no lasing ions. This glass also is an embodiment of the transparent armor aspect of the invention.

Tables 2A and 2B summarize properties of lanthanum aluminoborosilicate glasses in accordance with the invention. Table 2C summarize properties of commercial Nd-doped phosphate laser glasses APG-1 (Nd:APG-1), APG-2 (Nd:APG-2), and IOG-1 (Nd:IOG-1), and Yb-doped phosphate laser glasses APG-1 (Yb:APG-1), APG-2 (Yb:APG-2), and IOG-1 (Yb:IOG-1). These glasses are sold by Schott North America, Inc.

As can be seen, the glasses in accordance with the invention exhibit 1) high Young's modulus, 2) high thermal conductivity, and 3) high fracture toughness and microhardness. These physical properties features demonstrate that the glass composition of the invention is suitable for use as a laser glass, as well as being suitable for use in transparent armor windows for ballistic protection applications.

Tables 3A and 3B summarize laser properties of lanthanum aluminoborosilicate glasses in accordance with the invention. Tables 3C and 3D summarize laser properties of commercial phosphate laser glasses. As can be seen, the glasses in accordance with the invention are characterized by a broad effective emission bandwidth, and the majority exhibit broader effective emission bandwidths than most, if not all, of the comparison commercial phosphate laser glasses.

Figure 1A:
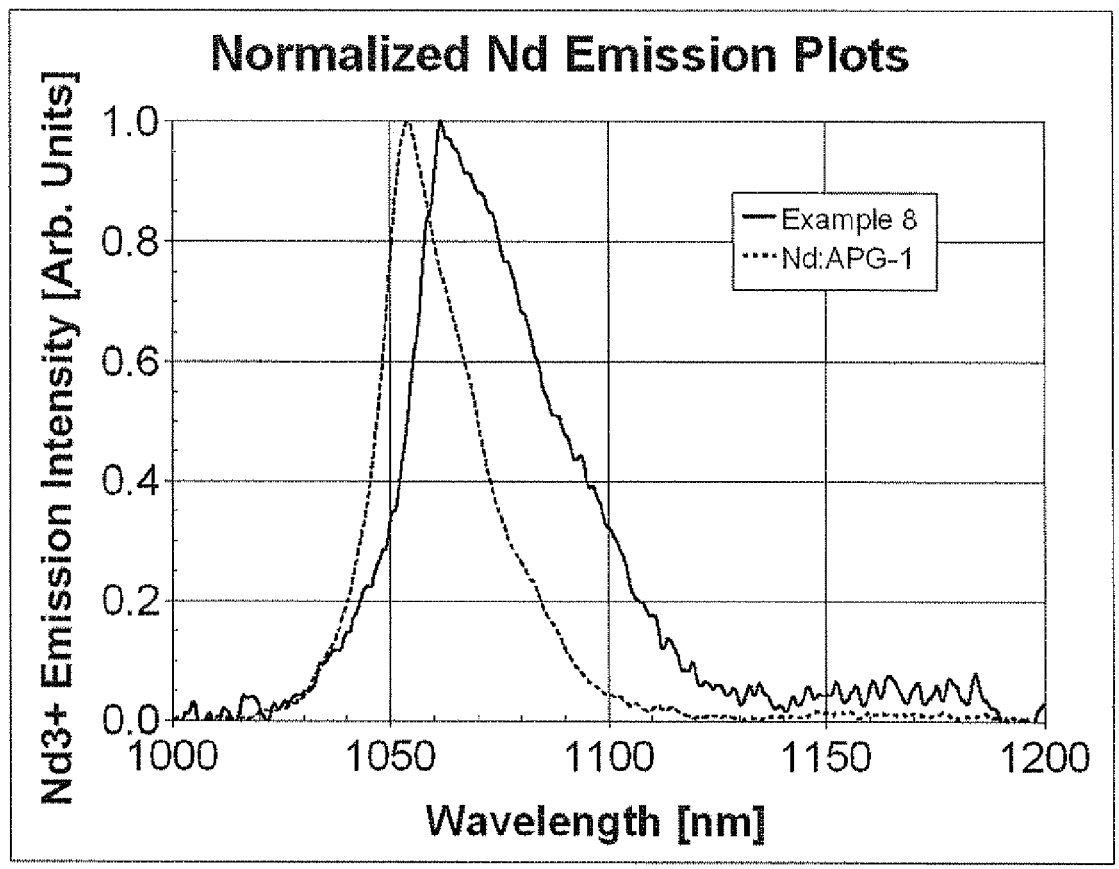
FIG. 1A graphically illustrates the improvement in emission bandwidth for Example 8 in comparison compared to a commercial Nd-doped phosphate laser glass (Nd:APG-1)
Figure 1B:
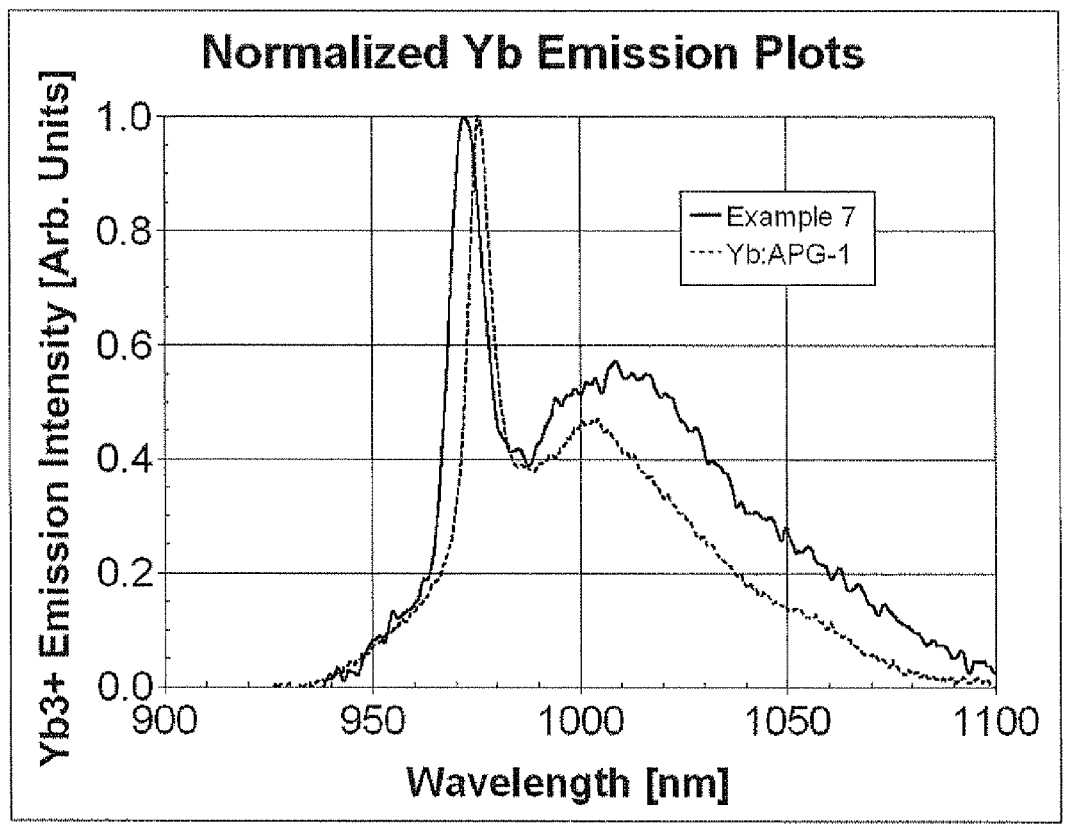
FIG. 1B graphically illustrates the improvement in emission bandwidth for Example 7 in comparison compared to a commercial Yb-doped phosphate laser glass (Yb:APG-1).

In FIG. 1, emission intensity is graphed as a function of emission wavelength when the samples are excited with 530 nm light in the case of Nd containing glasses and 918 nm in the case of Yb containing glasses. All of the glasses are cast into molds and appropriately annealed to remove stress. Example 7 which contains Yb was ground into fine powders using tungsten carbide grinding cell. A powdered sample is used in order to obtain a reliable emission spectrum, minimizing the excited state absorption (ESA). For Example 8, which contains Nd, the ESA is insignificant and therefore, a transparent glass block was used to measure Nd emission spectrum.

FIG. 1 graphically illustrates a comparison of Nd and Yb emission spectra of Examples 7 and 8 with APG-1 glasses containing Yb and Nd (commercially available laser glass sold by Schott North America, Inc), respectively. The results confirm that the lanthanum aluminoborosilicate glass according to the invention effectively broadens the lasing ion emission spectrum, thus further demonstrating that the glass composition according to the invention is very suitable for laser glass applications.

The bandwidth for the lanthanum aluminoborosilicate glasses according to the invention is comparable to that possessed by broad band aluminate glass. Yet, in addition to having a broad bandwidth, the lanthanum-containing aluminoborosilicate glasses according to the invention also exhibit significant manufacturing advantages. Due to their low alkali metal and alkaline earth metal contents, the lanthanum-containing aluminoborosilicate glasses according to the invention have a low tendency of melt crystallization in comparison to aluminate glasses.

TABLE 1A

Examples of $RE_2O_3$—$Al_2O_3$—$B_2O_3$—$SiO_2$ Glass Compositions (mol %) according to the Invention that do not contain Alkali or Alkaline Earth Metals

| Metal Oxide Content | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $SiO_2$ | 46.42 | 46.42 | 46.42 | 46.42 | 46.42 | 46.42 | 46.45 | 46.42 | 46.42 | 46.42 | 46.42 | 46.42 | 29.38 | 29.41 |
| $B_2O_3$ | 12.35 | 12.35 | 12.35 | 12.35 | 12.35 | 12.35 | 12.36 | 12.35 | 10.35 | 9.35 | 9.35 | 8.35 | 24.29 | 24.31 |
| $Al_2O_3$ | 18.92 | 18.92 | 18.92 | 18.92 | 18.92 | 18.92 | 18.93 | 18.92 | 19.92 | 20.92 | 20.92 | 21.92 | 20.32 | 20.34 |
| $La_2O_3$ | 22.31 | 20.31 | 18.31 | 14.31 | 20.31 | 18.31 | 21.83 | 21.81 | 22.31 | 22.81 | 22.81 | 22.81 | 25.13 | 25.15 |
| $Yb_2O_3$ | 0.00 | 2.00 | 4.00 | 8.00 | 0.00 | 0.00 | 0.43 | 0.00 | 0.00 | 0.00 | 0.50 | 0.00 | 0.00 | 0.64 |
| $Nd_2O_3$ | 0.00 | 0.00 | 0.00 | 0.00 | 2.00 | 4.00 | 0.00 | 0.50 | 0.50 | 0.50 | 0.00 | 0.50 | 0.75 | 0.00 |
| $Sb_2O_3$ | 0.00 | 0.00 | 0.00 | 0.00 | 0.00 | 0.00 | 0.00 | 0.00 | 0.00 | 0.00 | 0.00 | 0.00 | 0.14 | 0.14 |
| Total | 100.0 | 100.0 | 100.0 | 100.0 | 100.0 | 100.0 | 100.0 | 100.0 | 99.5 | 100.0 | 100.0 | 100.0 | 100.01 | 99.99 |

TABLE 1B

Examples of $RE_2O_3$—$Al_2O_3$—$B_2O_3$—$SiO_2$ Glass Compositions (mol %) according to the Invention that contain Alkali or Alkaline Earth Metals

| Metal Oxide Content | Examples | | | | |
|---|---|---|---|---|---|
| | 15 | 16 | 17 | 18 | 19 |
| $SiO_2$ | 46.52 | 41.52 | 41.52 | 54.25 | 54.25 |
| $B_2O_3$ | 12.35 | 10.35 | 8.35 | 14.31 | 14.31 |
| $Al_2O_3$ | 18.92 | 20.92 | 22.92 | 4.44 | 4.44 |
| $La_2O_3$ | 0.00 | 0.00 | 0.00 | 5.25 | 1.25 |
| $Yb_2O_3$ | 0.00 | 0.00 | 0.00 | 4.00 | 8.00 |
| $Nd_2O_3$ | 0.50 | 0.50 | 0.50 | 0.00 | 0.00 |
| MgO | 21.71 | 26.71 | 26.71 | 0.00 | 0.00 |
| $Sb_2O_3$ | 0.00 | 0.00 | 0.00 | 0.00 | 0.00 |
| $P_2O_5$ | 0.00 | 0.00 | 0.00 | 0.00 | 0.00 |
| $Li_2O$ | 0.00 | 0.00 | 0.00 | 0.00 | 0.00 |
| $Na_2O$ | 0.00 | 0.00 | 0.00 | 17.75 | 17.75 |
| $As_2O_3$ | 0.00 | 0.00 | 0.00 | 0.00 | 0.00 |
| Total | 100.0 | 100.0 | 100.0 | 100.0 | 100.0 |

TABLE 2A

Optical, Thermal, and Physical Properties of Example Compositions according to the Invention

| Optical/Thermal/ Physical Property | Examples | | | | | | |
|---|---|---|---|---|---|---|---|
| | 1 | 5 | 6 | 8 | 10 | 12 | 13 |
| Refractive Index at 587 nm @ 30 C./hr, $n_d$ | 1.72064 | 1.72199 | 1.72178 | 1.71536 | 1.72393 | 1.72508 | 1.7405 |
| Abbe Number, $V_d$ | 51.28 | 51.14 | 51.18 | 51.40 | 50.92 | 50.88 | 50.93 |
| Density, $\rho$ [g/cm$^3$] | 4.089 | 4.112 | 4.116 | 4.118 | 4.109 | 4.125 | 4.264 |
| Indentation Fracture Toughness for 3.0N Load, $K_{IC}$ | 1.06 | 1.00 | 1.08 | 0.98 | 1.00 | 1.02 | |
| Thermal Conductivity @ 25 C., $K_{25\,C.}$ [W/mK] | 0.82 | 0.81 | 0.82 | 0.77 | 0.78 | 0.78 | |
| Thermal Conductivity @ 90 C., $K_{90\,C.}$ [W/mK] | 0.88 | 0.87 | 0.87 | 0.88 | 0.89 | 0.89 | |
| Poisson Ratio, $\nu$ | 0.30 | 0.30 | 0.30 | 0.30 | 0.30 | 0.30 | |
| Young's Modulus, E [GPa] | 104.2 | 104.4 | 105.3 | 104.2 | 106.6 | 107.0 | |
| Linear Coef. Of Thermal Expansion, $\alpha_{20-300\,C.}$ [$10^{-7}$/K] | 63.8 | 63.0 | 62.8 | 62.0 | 63.2 | 61.4 | |
| Glass Transition Temperature, $T_g$ [C.] (DTA) | 778 | 774 | 787 | 784 | 825 | 827 | |
| Knoop Hardness, HK | 703 | 635 | 635 | 606 | 628 | 633 | |
| $\alpha_{3.333\,mm}$ [cm$^{-1}$] (A measure of residual OH content) | 1.10 | 1.11 | 1.17 | 1.12 | 0.84 | 0.87 | |
| $\alpha_{3.0\,mm}$ [cm$^{-1}$] (A measure of residual OH content) | .53 | .57 | 0.60 | 0.56 | 0.60 | 0.61 | |
| CTE 20-40((10−7)/C.) | 50.5 | 34.3 | 39.1 | 46.7 | | | |

TABLE 2B

Optical, Thermal, and Physical Properties of Example Compositions according to the Invention

| Optical/Thermal/ Physical Property | Examples | | | | | | |
|---|---|---|---|---|---|---|---|
| | 2 | 3 | 4 | 7 | 14 | 18 | 19 |
| Refractive Index at 587 nm @ 30 C./hr, $n_d$ | 1.71664 | 1.71538 | 1.70903 | 1.72118 | 1.74 | 1.58832 | 1.57638 |
| Abbe Number, $V_d$ | 51.61 | 51.64 | 52.22 | 51.26 | 50.93 | 55.8 | 56.36 |
| Density, $\rho$ [g/cm$^3$] | 4.141 | 4.215 | 4.342 | 4.115 | 4.275 | 3.316 | 3.433 |
| Indentation Fracture Toughness for 3.0N Load, $K_{IC}$ | 0.97 | 0.967 | 1.03 | 0.99 | | 0.89 | 0.92 |
| Thermal Conductivity @ 25 C., $K_{25\,C.}$ [W/mK] | 0.87 | 0.81 | 0.81 | 0.76 | | 0.81 | 0.78 |
| Thermal Conductivity @ 90 C., $K_{90\,C.}$ [W/mK] | 0.87 | 0.87 | 0.87 | 0.87 | | 0.87 | 0.84 |
| Poisson Ratio, $\nu$ | 0.30 | 0.30 | 0.30 | 0.30 | | 0.26 | 0.26 |
| Young's Modulus, E [GPa] | 105.6 | 106.7 | 108.2 | 105.3 | | 81.0 | 80.0 |
| Linear Coef. of Thermal Expansion, $\alpha_{20\text{-}300\,C.}$ [10$^{-7}$/K] | 61.5 | 61.6 | 59.7 | 89.2 | | 84.1 | 83.7 |
| Glass Transition Temperature, $T_g$ [C.] (Dilatometer) | | | | | | 610 | 625 |
| Glass Transition Temperature, $T_g$ [C.] (DTA) | 783 | 790 | 798 | 781 | | 630 | 638 |
| Knoop Hardness, HK | 620 | 640 | 662 | 616 | | 551 | 553 |
| $\alpha_{3.333\,mm}$ [cm$^{-1}$] (A measure of residual OH content) | 1.22 | 1.25 | 1.34 | 1.08 | | 2.02 | 2.13 |
| $\alpha_{3.0\,mm}$ [cm$^{-1}$] (A measure of residual OH content) | 0.63 | 0.60 | 0.62 | 0.54 | | 0.83 | 0.71 |
| CTE 20-40((10−7)/C.) | 42.5 | 43.5 | 49.9 | 41.9 | | 59.7 | 56.1 |

TABLE 2C

Optical, Thermal, and Physical Properties of Comparison Glasses

| Optical/Thermal/ Physical Property | Glasses | | | | | |
|---|---|---|---|---|---|---|
| | Nd: APG-1 | Nd: APG-2 | Nd: IOG-1 | Yb: APG-1 | Yb: APG-2 | Yb: IOG-1 |
| Refractive Index at 587 nm @ 30 C./hr, $n_d$ | 1.53269 | 1.50900 | 1.52490 | 1.52935 | 1.50443 | 1.52060 |
| Abbe Number, $V_d$ | 67.80 | 67.40 | 67.5 | 68.39 | 67.02 | 67.61 |
| Density, $\rho$ [g/cm$^3$] | 2.607 | 2.561 | 2.718 | 2.622 | 2.566 | 2.733 |
| Indentation Fracture Toughness for 3.0N Load, $K_{IC}$ | 0.83 | | | 0.84 | | |
| Thermal Conductivity @ 25 C., $K_{25\,C.}$ [W/mK] | 0.79 | 0.76 | | 0.81 | 0.78 | |
| Thermal Conductivity @ 90 C., $K_{90\,C.}$ [W/mK] | 0.86 | 0.83 | 0.86 | 0.86 | 0.83 | |
| Poisson Ratio, $\nu$ | 0.25 | 0.24 | 0.25 | 0.24 | 0.23 | |
| Young's Modulus, E [GPa] | 66.8 | 61.7 | 66.8 | 67.1 | 61.4 | |
| Linear Coef. of Thermal Expansion, $\alpha_{20\text{-}300\,C.}$ [10$^{-7}$/K] | 99.3 | 63.7 | 99.3 | 97.4 | 59.0 | |
| Glass Transition Temperature, $T_g$ [C.] (Dilatometer) | 457 | 546 | | 475 | 554 | |
| Glass Transition Temperature, $T_g$ [C.] (DTA) | | | | | | |

TABLE 2C-continued

Optical, Thermal, and Physical Properties of Comparison Glasses

| Optical/Thermal/Physical Property | Glasses | | | | | |
|---|---|---|---|---|---|---|
| | Nd: APG-1 | Nd: APG-2 | Nd: IOG-1 | Yb: APG-1 | Yb: APG-2 | Yb: IOG-1 |
| Knoop Hardness, HK | 434 | 400 | | 464 | 381 | |
| $\alpha_{3.333\,mm}$ [cm$^{-1}$] (A measure of residual OH content) | 1.28 | 0.47 | | 1.60 | 0.48 | 1.31 |
| $\alpha_{3.0\,mm}$ [cm$^{-1}$] (A measure of residual OH content) | 0.64 | 0.27 | 0.46 | 0.97 | 0.29 | 0.70 |
| CTE 20-40((10−7)/C.) | | | | | | 15 |

TABLE 3A

Laser Properties of Example Compositions according to the Invention

| Laser Property | Examples | | | | | |
|---|---|---|---|---|---|---|
| | 5 | 6 | 8 | 10 | 12 | 13 |
| Refractive Index at 1054 nm, $n_{1054\,nm}$ | 1.704 | 1.704 | 1.697 | 1.706 | 1.707 | 1.722 |
| Non-linear Refractive Index, $n_2$ [$10^{-13}$ esu] | 2.86 | 2.86 | 2.79 | 2.89 | 2.91 | 3.02 |
| Fluorescence Lifetime, $\tau$ [msec] | | 23.2 | | 207.3 | | 99.5 |
| Input Nd$_2$O$_3$ [wt %] | 5.23 | 10.44 | 1.31 | 1.28 | 1.27 | 1.80 |
| Peak Emission Wavelength, $\lambda_{Peak}$ [nm] (Judd-Ofelt) | 1061.9 | 1061.0 | 1061.7 | 1062.8 | 1062.2 | 1061.9 |
| Effective Emission Bandwidth, $\Delta\lambda_{eff}$ [nm] (Judd-Ofelt) | 41.33 | 36.45 | 43.51 | 40.56 | 46.96 | 41.33 |
| Maximum Emission Cross Section, $\sigma_{em}$ [cm$^2$] (Judd-Ofelt) | 2.50 | 2.87 | 2.44 | 2.61 | 2.24 | 2.67 |
| FWHM Emission Bandwidth, $\Delta\lambda_{FWHM}$ [nm] (Judd-Ofelt) | 35.3 | 31.3 | 35.2 | 34.1 | 38.1 | 35.3 |
| Radiative Lifetime, $\tau_{Rad}$ (msec) | 272 | 268 | 262 | 263 | 265 | 251 |
| Judd-Ofelt Parameter, $\Omega_2$ [$10^{-20}$ cm$^2$] | 3.71 | 3.72 | 3.71 | 3.75 | 3.76 | 3.30 |
| Judd-Ofelt Parameter, $\Omega_4$ [$10^{-20}$ cm$^2$] | 4.32 | 4.36 | 4.72 | 4.53 | 4.47 | 4.44 |
| Judd-Ofelt Parameter, $\Omega_6$ [$10^{-20}$ cm$^2$] | 4.82 | 4.89 | 4.90 | 4.89 | 4.86 | 5.11 |

TABLE 3B

Laser Properties of Further Example Compositions according to the Invention

| Laser Property | Examples | | | | | | |
|---|---|---|---|---|---|---|---|
| | 2 | 3 | 4 | 7 | 14 | 18 | 19 |
| Refractive Index at 1000 nm, $n_{1000\,nm}$ | 1.703 | 1.702 | 1.696 | 1.707 | 1.726 | 1.578 | 1.566 |
| Non-linear Refractive Index, $n_2$ | 2.78 | 2.77 | 2.68 | 2.85 | 3.01 | 1.75 | 1.67 |

TABLE 3B-continued

Laser Properties of Further Example Compositions according to the Invention

| Laser Property | \multicolumn{7}{c}{Examples} | | | | | | |
|---|---|---|---|---|---|---|---|
| | 2 | 3 | 4 | 7 | 14 | 18 | 19 |
| $[10^{-13}$ esu] Fluorescence Lifetime, $\tau$ [msec] | 1190 | | | 1238 | 863 | 1126 | |
| Input $Yb_2O_3$ [wt %] | 6.06 | 11.99 | 23.54 | 1.31 | 1.80 | 17.33 | 33.65 |
| $\lambda_{Peak}^P$ [nm] (Judd-Ofelt) | 976.3 | 976.8 | 976.7 | 972.4 | 976.5 | 976.4 | 976.6 |
| Effective Emission Bandwidth, $\Delta\lambda_{eff}$ [nm] (Judd-Ofelt) | 34.83 | 42.39 | 62.57 | 52.41 | 43.01 | 50.14 | 61.46 |
| Maximum $\sigma_{em}^P$ $[10^{-20}$ cm$^2]$ (Judd-Ofelt) | 2.00 | 1.68 | | 1.37 | 1.76 | 1.08 | |
| Maximum $\sigma_{em}^s$ $[10^{-20}$ cm$^2]$ (Judd-Ofelt) | 0.78 | 0.87 | | 0.91 | 0.83 | 0.68 | |
| $\lambda_{Peak}^s$ [nm] (Judd-Ofelt) | 1007.4 | 1017.1 | 1018.5 | 1008.9 | 1006.9 | 1016.1 | 1020.4 |
| $\Delta\lambda_{FWHM}$ [nm] (Judd-Ofelt) | 28.4 | 10.4 | 15.9 | 12.3 | 10.5 | 11.4 | 71.7 |
| $\tau_R$ [msec] (Judd-Ofelt) | 0.60 | 0.58 | | 0.57 | 0.54 | 0.90 | |
| $\lambda_{Peak}^P$ [nm] (McCumber) | 976.2 | 976.2 | | 976.6 | 976.0 | 975.8 | |
| $\Delta\lambda_{eff}$ [nm] (McCumber) | 17.51 | 19.86 | | 19.83 | 19.19 | 20.71 | |
| Maximum $\sigma_{em}^P$ $[10^{-20}$ cm$^2]$ (McCumber) | 2.98 | 2.69 | | 2.76 | 2.95 | 1.95 | |
| Maximum $\sigma_{em}^s$ $[10^{-20}$ cm$^2]$ (McCumber) | 0.70 | 0.74 | | 0.72 | 0.78 | 0.61 | |
| $\lambda_{Peak}^s$ [nm] (McCumber) | 1005.9 | 1006.0 | | 1005.1 | 1004.3 | 1004.5 | |
| $\Delta\lambda_{FWHM}$ [nm] (McCumber) | 6.5 | 7.6 | | 7.3 | 7.3 | 7.4 | |
| $\tau_R$ [msec] (McCumber) | 0.60 | 0.55 | | 0.60 | 0.54 | 0.90 | |
| Radiation Trapping Coefficient, rtc | 0.66 | 0.89 | | 1.54 | 0.80 | 1.04 | |

TABLE 3C

Laser Properties of Nd-doped Phosphate Comparison Glasses

| Laser Property | Nd: APG-1 | Nd: APG-2 | Nd: IOG-1 |
|---|---|---|---|
| Refractive Index at 1054 nm, $n_{1054\,nm}$ | 1.525 | 1.501 | 1.515 |
| Non-linear Refractive Index, $n_2$ $[10^{-13}$ esu] | 1.11 | 1.04 | 1.09 |
| Fluorescence Lifetime, $\tau$ [msec] | 353.9 | 335.6 | 359.4 |
| Input $Nd_2O_3$ [wt %] | 2.96 | 3.47 | 2.05 |
| Peak Emission Wavelength, $\lambda_{Peak}$ [nm] | 1054.3 | 1054.6 | 1053.4 |
| Effective Emission Bandwidth, $\Delta\lambda_{eff}$ [nm] | 28.44 | 31.79 | 24.78 |
| Maximum Emission Cross Section, $\sigma_{em}$ [cm$^2$] | 3.68 | 2.69 | 3.91 |
| FWHM Emission Bandwidth, $\Delta\lambda_{FWHM}$ [nm] | 23.3 | 26.3 | 21.7 |
| Radiative Lifetime, $\tau_{Rad}$ (msec) | 331 | 416 | 364 |
| Judd-Ofelt Parameter, $\Omega_2$ $[10^{-20}$ cm$^2]$ | 4.43 | 6.13 | 4.55 |
| Judd-Ofelt Parameter, $\Omega_4$ $[10^{-20}$ cm$^2]$ | 5.05 | 4.30 | 4.51 |
| Judd-Ofelt Parameter, $\Omega_6$ $[10^{-20}$ cm$^2]$ | 5.68 | 4.68 | 5.37 |

TABLE 3D

Laser Properties of Nd-doped Phosphate Comparison Glasses

| Laser Property | Yb: APG-1 | Yb: APG-2 | Yb: IOG-1 |
|---|---|---|---|
| Refractive Index at 1000 nm, $n_{1000\,nm}$ | 1.522 | 1.497 | 1.513 |
| Non-linear Refractive Index, $n_2$ $[10^{-13}$ esu] | 1.09 | 1.03 | 1.07 |

TABLE 3D-continued

Laser Properties of Nd-doped Phosphate Comparison Glasses

| Laser Property | Glasses | | |
|---|---|---|---|
| | Yb: APG-1 | Yb: APG-2 | Yb: IOG-1 |
| Fluorescence Lifetime, τ [msec] | 2150 | 2710 | 2542 |
| Input $Yb_2O_3$ [wt %] | 4.75 | 4.72 | 4.73 |
| $\lambda_{Peak}^P$ [nm] (Judd-Ofelt) | 975.5 | 975.2 | 976.1 |
| Effective Emission Bandwidth, $\Delta\lambda_{eff}$ [nm] (Judd-Ofelt) | 40.09 | 35.67 | 34.86 |
| Maximum $\sigma_{em}^P$ [$10^{-20}$ cm$^2$] (Judd-Ofelt) | 1.10 | 1.20 | 1.31 |
| Maximum $\sigma_{em}^s$ [$10^{-20}$ cm$^2$] (Judd-Ofelt) | 0.64 | 0.61 | 0.63 |
| $\lambda_{Peak}^s$ [nm] (Judd-Ofelt) | 1002.7 | 1003 | 1005.1 |
| $\Delta\lambda_{FWHM}$ [nm] (Judd-Ofelt) | 9.7 | 8.6 | 8.6 |
| $\tau_R$ [msec] (Judd-Ofelt) | 1.18 | 1.25 | 1.15 |
| $\lambda_{Peak}^P$ [nm] (McCumber) | 974.9 | 974.7 | 975.5 |
| $\Delta\lambda_{eff}$ [nm] (McCumber) | 18.71 | 19.70 | 18.28 |
| Maximum $\sigma_{em}^P$ [$10^{-20}$ cm$^2$] (McCumber) | 1.76 | 1.63 | 1.87 |
| Maximum $\sigma_{em}^s$ [$10^{-20}$ cm$^2$] (McCumber) | 0.56 | 0.56 | 0.56 |
| $\lambda_{Peak}^s$ [nm] (McCumber) | 1002.2 | 1002.3 | 1003.2 |
| $\Delta\lambda_{FWHM}$ [nm] (McCumber) | 6.1 | 6.3 | 6.0 |
| $\tau_R$ [msec] (McCumber) | 1.18 | 1.23 | 1.24 |
| Radiation Trapping Coefficient, rtc | 0.85 | 0.49 | 0.61 |

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An aluminoborosilicate glass composition consisting essentially of (based on mol %):

| | |
|---|---|
| $SiO_2$ | 25.00-57.00 |
| $B_2O_3$ | 5.00-28.00 |
| $Al_2O_3$ | 2.00-27.00 |
| $La_2O_3$ | 5.00-18.00 |
| $R_2O$ (R = Li, Na, K, Rb, Cs) | 0.00-27.00 |
| MO (M = Mg, Ca, Sr, Ba, Zn) | 0.00-30.00. |

2. An aluminoborosilicate glass composition according to claim 1, wherein said glass composition contains no lasing rare earth ions.

3. An aluminoborosilicate glass composition according to claim 1, wherein said glass composition consists essentially of (based on mol %):

| | |
|---|---|
| $SiO_2$ | 30.00-55.00 |
| $B_2O_3$ | 5.00-25.00 |
| $Al_2O_3$ | 3.00-25.00 |
| $La_2O_3$ | 5.00-18.00 |
| $R_2O$ (R = Li, Na, K, Rb, Cs) | 0.00-20.00 |
| MO (M = Mg, Ca, Sr, Ba, Zn) | 0.00-27.00. |

4. An aluminoborosilicate glass composition according to claim 3, wherein said glass composition contains no lasing rare earth ions.

5. An aluminoborosilicate glass composition according to claim 1, wherein the aluminoborosilicate glass composition contains 27.00-57.00 mol % of $SiO_2$.

6. An aluminoborosilicate glass composition according to claim 1, wherein the aluminoborosilicate glass composition contains 6.00-27.00 mol % of $B_2O_3$.

7. An aluminoborosilicate glass composition according to claim 1, wherein the aluminoborosilicate glass composition contains 2.00-25.00 mol % of $Al_2O_3$.

8. An aluminoborosilicate glass composition according to claim 1, wherein the aluminoborosilicate glass composition contains 5.00-15.00 mol % of $La_2O_3$.

9. An aluminoborosilicate glass composition according to claim 1, wherein the ratio of $Al_2O_3$ to $La_2O_3$ is 0.70-5.00.

10. An aluminoborosilicate glass composition according to claim 1, wherein the aluminoborosilicate glass composition possesses a Young's Modulus of at least 80 GPa.

11. An aluminoborosilicate glass composition according to claim 1, wherein the aluminoborosilicate glass composition possesses an Indentation Fracture Toughness for 3.0N Load, $K_{IC}$, of at least 0.80 MPa·m$^{1/2}$.

12. An aluminoborosilicate glass composition according to claim 1, wherein the aluminoborosilicate glass composition possesses a Knoop Hardness, HK, of at least 550.

13. In a transparent armor material comprising at least one layer of glass, the improvement wherein said at least one layer of glass is a glass composition according to claim 1.

14. An aluminoborosilicate glass composition comprising (based on mol %):

| | |
|---|---|
| $SiO_2$ | 25.00-57.00 |
| $B_2O_3$ | 5.00-28.00 |
| $Al_2O_3$ | 2.00-27.00 |
| $La_2O_3$ | 13.00-28.00 |
| $R_2O$ (R = Li, Na, K, Rb, Cs) | 0.00-27.00 |
| MO (M = Mg, Ca, Sr, Ba, Zn) | 0.00-30.00 |
| $Ln_2O_3$ (Ln = Nd, Yb, or other lasing rare earth ions) | >0.30-10.00 |
| Sum of $La_2O_3$ + $Ln_2O_3$ | >13.30-30.00. |

15. An aluminoborosilicate glass composition according to claim 14, wherein said glass composition comprises (based on mol %):

| | |
|---|---|
| $SiO_2$ | 30.00-55.00 |
| $B_2O_3$ | 5.00-25.00 |
| $Al_2O_3$ | 3.00-25.00 |
| $La_2O_3$ | 13.00-25.00 |
| $R_2O$ (R = Li, Na, K, Rb, Cs) | 0.00-20.00 |
| MO (M = Mg, Ca, Sr, Ba, Zn) | 0.00-27.00 |
| $Ln_2O_3$ (Ln = Nd, Yb, or other lasing rare earth ions) | >0.30-8.00 |

-continued

| | |
|---|---|
| Sum of $La_2O_3$ + $Ln_2O_3$ | >13.30-28.00. |

16. An aluminoborosilicate glass composition according to claim 14, wherein said glass composition comprises (based on mol %):

| | |
|---|---|
| $SiO_2$ | 40.00-50.00 |
| $B_2O_3$ | 5.00-25.00 |
| $Al_2O_3$ | 15.00-27.00 |
| $La_2O_3$ | 13.00-25.00 |
| $Yb_2O_3$ | 0.00-8.00 |
| $Nd_2O_3$ | 0.00-6.00 | wherein the aluminoborosilicate glass composition is essentially free of alkali metals and alkaline earth metals.

17. An aluminoborosilicate glass composition according to claim 16, wherein said glass composition comprises (based on mol %):

| | |
|---|---|
| $SiO_2$ | 40.00-50.00 |
| $B_2O_3$ | 5.00-18.00 |
| $Al_2O_3$ | 15.00-27.00 |
| $La_2O_3$ | 13.00-25.00 |
| $Yb_2O_3$ | 0.00-8.00 |
| $Nd_2O_3$ | 0.00-6.00 | wherein the aluminoborosilicate glass composition is essentially free of alkali metals and alkaline earth metals.

18. An aluminoborosilicate glass composition according to claim 14, wherein the amount of $Ln_2O_3$, wherein Ln represents a rare earth lasing ion, is 0.5-8 mol %.

19. An aluminoborosilicate glass composition according to claim 14, wherein the lasing element Ln is Nd or Yb.

20. An aluminoborosilicate glass composition according to claim 14, wherein the sum of the $La_2O_3$ and $Ln_2O_3$ content in the aluminoborosilicate glass composition is >13.30-28.00 mol %.

21. An aluminoborosilicate glass composition according to claim 14, wherein the aluminoborosilicate glass composition contains 0.10-10.00 mol % $Yb_2O_3$ and/or 0.10-5.00 mol % $Nd_2O_3$.

22. An aluminoborosilicate glass composition according to claim 14, wherein the aluminoborosilicate glass composition contains $R_2O$, where R=Li, Na, K, Rb, Cs, and the ratio of $R_2O/(Al_2O_3+R_2O)$ is <0.40 or >0.60.

23. An aluminoborosilicate glass composition according to claim 14, wherein said composition exhibits an effective emission bandwidth ($\lambda\lambda_{eff}$) of at least 33 nm.

24. In a solid state laser system comprising a solid gain medium and a pumping source, the improvement wherein said solid gain medium is a glass having a composition in accordance with claim 14.

25. A laser system according to claim 24, wherein the power output of system is at least a pettawatt per pulse or greater.

26. A method for generating a laser beam pulse comprising flashlamp pumping or diode pumping a glass composition according to claim 14.

27. An aluminoborosilicate glass composition consisting essentially of (based on mol %):

| | |
|---|---|
| $SiO_2$ | 50.00-57.00 |
| $B_2O_3$ | 10.00-20.00 |
| $Al_2O_3$ | 3.00-10.00 |
| $La_2O_3$ | 5.00-10.00 |
| $Yb_2O_3$ | 0.00-10.00 |
| $Nd_2O_3$ | 0.00-6.00 |
| $R_2O$ (R = Li, Na, K, Rb, Cs) | 15.00-20.00 | wherein the aluminoborosilicate glass composition is essentially free of alkaline earth metals.

28. An aluminoborosilicate glass composition comprising (based on mol %):

| | |
|---|---|
| $SiO_2$ | 40.00-50.00 |
| $B_2O_3$ | 10.00-15.00 |
| $Al_2O_3$ | 15.00-25.00 |
| $La_2O_3$ | 0.00-5.00 |
| $Yb_2O_3$ | 0.00-5.00 |
| $Nd_2O_3$ | 0.00-5.00 |
| MO (M = Mg, Ca, Sr, Ba, Zn) | 15.00-25.00 | wherein the aluminoborosilicate glass composition is essentially free of alkali metals.

29. An aluminoborosilicate glass composition comprising (based on mol %):

| | |
|---|---|
| $SiO_2$ | 25.00-57.00 |
| $B_2O_3$ | 5.00-28.00 |
| $Al_2O_3$ | 2.00-27.00 |
| $La_2O_3$ | 5.00-28.00 |
| $R_2O$ (R = Li, Na, K, Rb, Cs) | >0.00-27.00 |
| MO (M = Mg, Ca, Sr, Ba, Zn) | 0.00-30.00 |
| $Ln_2O_3$ (Ln = Nd, Yb, or other lasing rare earth ions) | >0.30-10.00 |
| Sum of $La_2O_3$ + $Ln_2O_3$ | >5.30-30.00 | wherein the aluminoborosilicate glass composition contains $R_2O$, where R=Li, Na, K, Rb, Cs, and the ratio of $R_2O/(Al_2O_3+R_2O)$ is <0.40 or >0.60.

* * * * *

UNITED STATES PATENT AND TRADEMARK OFFICE
CERTIFICATE OF CORRECTION

PATENT NO. : 8,361,917 B2
APPLICATION NO. : 12/851034
DATED : January 29, 2013
INVENTOR(S) : Li et al.

It is certified that error appears in the above-identified patent and that said Letters Patent is hereby corrected as shown below:

Column 20, line 53, reads "$Ln_2O_3$ (Ln=Nd, Yb, or other lasing rare earth ions) >0.30-10.00"
should read -- $Ln_2O_3$ (Ln=Nd, Yb, or other lasing rare earth ions) >0.30-8.00 --

Signed and Sealed this
Second Day of April, 2013

Teresa Stanek Rea
*Acting Director of the United States Patent and Trademark Office*